April 3, 1928.

G. KÖNIG

METHOD OF MEASURING THE DENSITY OF GAS

Filed July 3, 1924 2 Sheets-Sheet 1

1,664,752

WITNESSES
Oliver W. Holmes

INVENTOR
Georg König
BY Knight Bros.
ATTORNEYS

April 3, 1928.  G. KÖNIG  1,664,752
METHOD OF MEASURING THE DENSITY OF GAS
Filed July 3, 1924  2 Sheets-Sheet 2
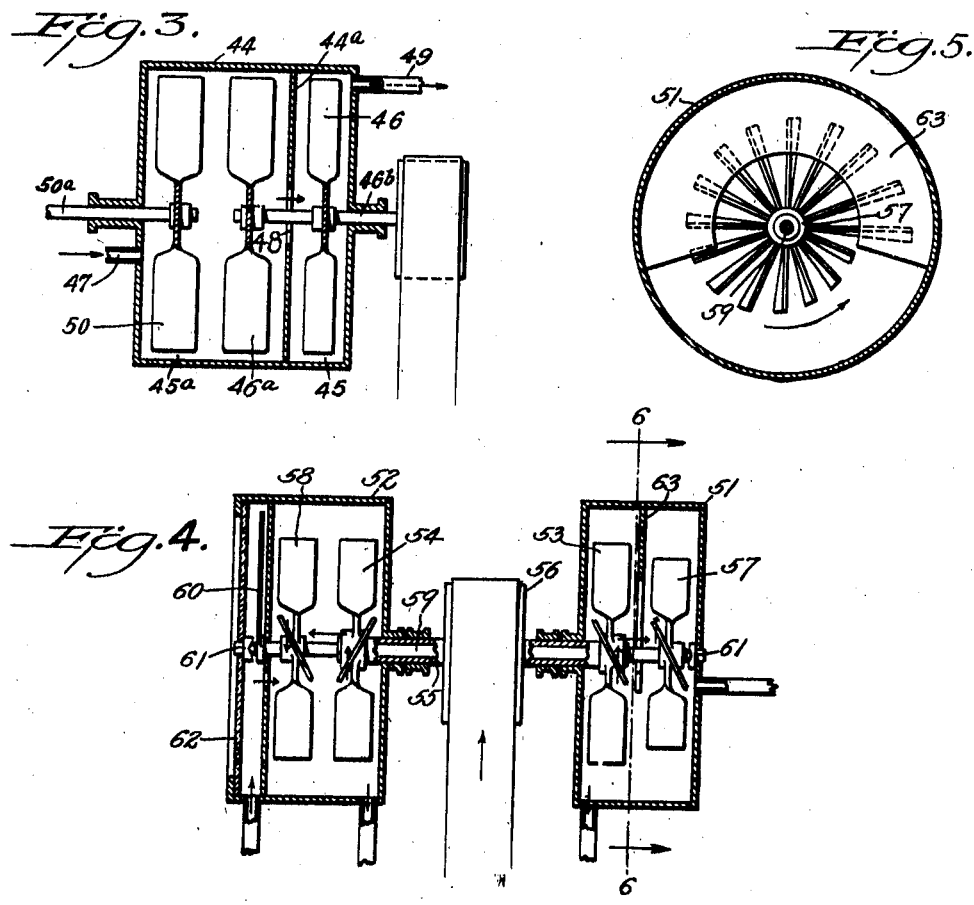

Patented Apr. 3, 1928.

1,664,752

UNITED STATES PATENT OFFICE.

GEORG KÖNIG, OF BERLIN-DAHLEM, GERMANY.

METHOD OF MEASURING THE DENSITY OF GAS.

Application filed July 3, 1924, Serial No. 723,976, and in Germany March 6, 1920.

This application is a continuation in part of my co-pending United States application, Serial No. 449,054, filed March 2, 1921, which discloses the invention set forth in my German Patent No. 341,572, for which application was filed on March 6, 1920.

It is old to measure the density of a gas by moving a solid body in the gas and measuring the energy required for this motion and it is also old to measure the different pressures at different points produced by a fan revolving in a closed casing containing the gas. Both depend on the fact that the heavier the gas the more energy is required to put it in motion. The present invention utilizes the fact that the heavier a moving gas the more energy or torque it can impart to a moving member acting as an anemometer.

According to the present invention, the energy is measured indirectly by producing in a gas-tight chamber a gas-current of circular or other path by a solid body, for example, a wheel, moved in this chamber. This current acts by means of its kinetic energy upon a second solid body acting as an anemometer and connected with a measuring device. In the best form of the invention now known to me a circular current and a rotative aerodynamic field are created in which the movable body connected to the measuring device is given torque and turned out of its normal position.

An important feature of the invention to be claimed herein consists in producing in a small and rugged device a relatively great energy available for measuring purposes.

A further feature of the invention consists in means directly indicating the relative values of the density of the gas to be measured and that of a standard gas of known density.

In comparing gases having variable water vapor contents, it is desirable to bring both gases, one of which, of course, may be a standard gas, to the same degree of humidity.

It is further desirable to eliminate suspended matter from the gas.

To cause an equal humidity in both gases, that to be examined and a standard gas, the gases may be passed through two conduits or chambers which are kept at the same temperature, which may be accomplished by having the two chambers sufficiently close to each other and in these conduits or chambers the gases may be subjected to drying operations or they may be subjected to humidifying processes as, for example, by having them pass over liquid surfaces in the conduits or chambers which, being at the same temperature, will insure equal humidity. When the humidifiers are not used and with gases of the same or of known relative density, the device becomes an indicator of the relative humidity.

To insure that the gas is free from suspended particles of matter, I provide a filter, through which the gas passes before its introduction to the meter, to abstract from the gas all such suspended material. The presence of suspended matter not only directly vitiates density determination but in the case of fume and dust causes deposits which are detrimental.

Suitable apparatus for carrying out my proposed method is illustrated in the accompanying drawings, in which Figure 1 is a vertical section of a gas density meter provided with filtering and humidifying adjuncts.

Figure 3 is an axial section of a detail of another form of instrument.

Figure 4 is an axial section of another modification involving my invention.

Figure 5 is a transverse section of the same modification taken on line 6—6 of Figure 4.

Figure 1:
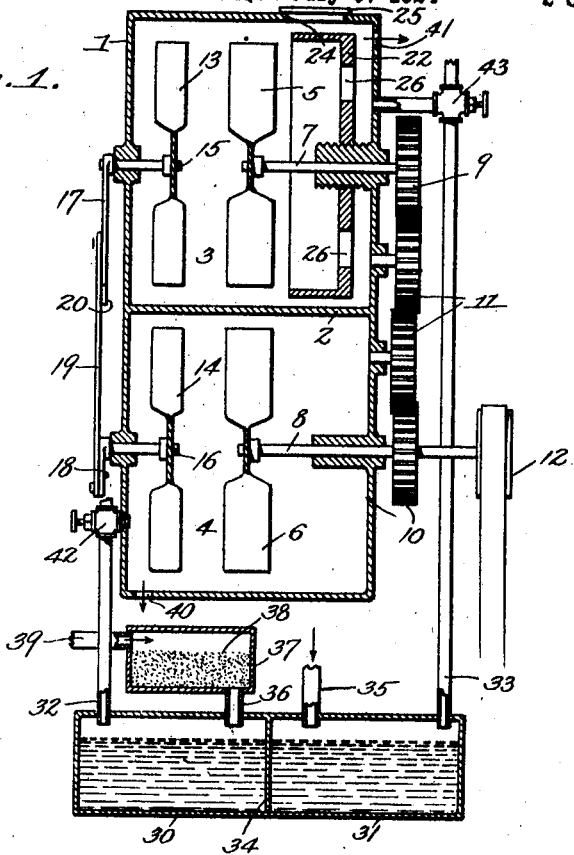

Referring to Figure 1 of the drawings, a casing 1 having a partition 2, forms two chambers 3 and 4. The chamber 3 may, for example, be occupied by air or by a standard gas of known density while the gas chamber 4 would be occupied by the gas whose density is to be measured. Mounted in chamber 3 is a movable member 5 and in chamber 4 a movable member 6 having the functions of impellers. These members are mounted upon shafts 7 and 8 on the outer ends of which are gear wheels 9 and 10 interconnected by intermediate gears 11. Upon one of the shafts is a pulley 12 driven by any suitable source of power. The movable members 5 and 6 are driven in opposite directions and create currents in opposite directions. These movable impeller members may be in the form of paddle wheels, as shown, or be of any other form that will give them the power to bring gas into the chamber and impart velocity to the body of gases in which they are immersed within the chamber. The gases are drawn in near the axis of the chambers through pipes 32 and 33 and expelled near the periphery as, for example, by openings 40 and 41. Opposed to the members 5 and 6 are similar members 13 and 14 which act similarly to anemometers mounted on shafts 15 and 16 and adapted to be actuated or given torque by the currents in the chambers. These currents being in opposite directions the torque exerted on shafts 15 and 16 is opposite. These shafts have lever arms 17 and 18 outside the casing, which are connected by a link 19, the length of which must be either greater or less than the distance between the shafts 15 and 16, thus forming a trapezoidal arrangement, the purpose of which will appear below.

Figure 2:
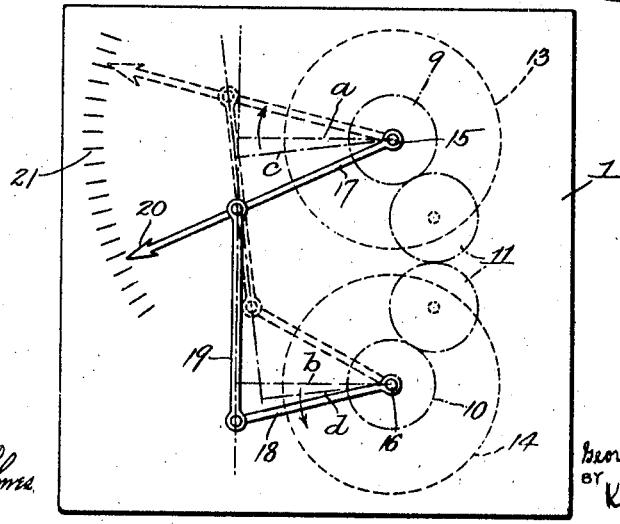
Figure 2 is a front view of the dial plate of the structure of Fig. 1.

One of the arms, as for instance 17, may have a pointer as at 20 moving over a scale 21. The torque exerted by members 5 and 6 being in opposite directions will naturally cause the members 13 and 14, through the driving effect of the currents of gas, to move also in opposite directions. Their tendency thus to move will be balanced by the lever arms 17 and 18 being connected through link 19. If the gas to be measured in chamber 4 is lighter than the gas in chamber 3, the member 13 will have more energy imparted to it by the moving gas than the member 14 and the lever arms 17 and 18 will, therefore, move in the direction of the motion of the member 13 until, by reason of the change in angular displacement of the two lever arms 17 and 18, a position of balance is reached and at this point the pointer 20 will, upon a properly calibrated scale 21, indicate the relative density of the gas to be measured to that of the standard gas. This will be clearly seen by reference to Figure 2, in which it is evident that the position of the levers shown in dotted lines, will require the upper movable member to have a greater rotative force than the lower movable member, to hold the latter in balance. In the position shown by the full lines, the effective lengths $a$ and $b$ of the two levers 17 and 18 are more nearly equal than the effective lengths of the levers when in the dotted position. In the latter case, the effective length $d$ of the lever 18 is considerably less than the effective length $c$ of the lever 17. As the fan running in air, for example, in chamber 3 is coupled to lever 17 and the fan running in the gases to be measured in chamber 4 is coupled to lever 18, the lever system takes up a position where the torque of the air fan balances the torque of the fan in the gas to be measured, so that the pointer indicates the relative density of the gases being measured as compared with air. After working for a considerable time, fine dust will often collect in the fan chambers, resulting in the instrument reading wrongly and adjustment may be necessary for this and other reasons. It is, therefore, desirable to have some means of adjustment to insure that the pointer shall stand at zero when the densities of the gases in the two chambers are equal. As one means of accomplishing this, I may provide an adjustable shroud 22 (see Figure 1). This shroud is made in the form of a cylindrical cup and has at its center a screw-threaded orifice where it is mounted on the screw-threaded exterior of the bearing that carries the shaft of the movable member. Any suitable means may be used to hold it securely in its position. It may be moved by inserting a finger through an opening at 24 which may be covered by a cap 25. Orifices 26 may be provided in the shroud to allow circulation of the gas. It is evident that when the shroud is adjusted so as to cover more of the movable member, it will interfere with the effectiveness of the member as a propeller of the gas and thereby furnish a means of adjusting the effectiveness of this impeller with respect to the other impeller in the other chamber so as to enable the operator to bring about a zero adjustment of the pointer on the scale.

It will be understood that any means whereby the effectiveness of the inductive influence of the driving member on the driven member may be varied will come within the scope of my invention. It will be understood that to make the zero adjustment both chambers are filled with the same gases. For example, to do this it is only necessary to turn three-way cocks 42 and 43 so as to admit only air to the chambers.

In order to regulate the humidity, I provide humidifying chambers 30 and 31, the former being connected through conduit 32 with the inlet of the chamber 4 and the latter through conduit 33 with the inlet of chamber 3. The chambers 30 and 31 may be partially filled with water and the air or gases passing over the water will become equally humid, it being only necessary to have both chambers at equal temperature which can be further insured by having them provided with a common wall 34. Air or a standard gas can be admitted to chamber 31 through orifice 35 and the gas to be measured can be admitted to chamber 30 through conduit 36 leading from a filter chamber 37, which may be filled with sand, sawdust or the like 38. A pipe 39 brings the gas to be measured to the filter where all solid particles or particles in suspension will be removed, it being essential of course, in apparatus of this kind that the gas be free from such impurities.

The instrument may be used for measuring the humidity of a gas or the relative humidity of two gases, in which case, of course, the gases are passed to the instrument without coming in contact with liquid in a humidifier as described above. The instrument may be used to measure the density of flue gases. As one percent $CO_2$ in the flue gases increases the density approximately 0.4 percent as compared with air, the scale may be graduated in percent $CO_2$. As the flue gases are often saturated with humidity at room temperature, in such cases it will be sufficient to saturate the standard gas only by the use of a humidifier.

Measurements are improved by relieving the circulating member of the duty of supplying and discharging gas. This is done in the modified structure shown in Fig. 3, where casing 44 is divided into two chambers 45 and 45ª by the partition 44ª. Within chamber 45 is the fan 46 mounted on shaft 46ᵇ, drawing gas through inlet 47 into chamber 45ª, thence through orifice 48 into chamber 45, and discharging the gas through outlet 49. Mounted on the shaft 46ᵇ which carries the fan 46, is also the impeller member 46ª imparting torque via the gas within chamber 45ª to wheel 50, the shaft 50ª of which leads to the outside of chamber 45ª, and is connected to registering means, (not shown).

The cumulative resistance of the registering means may be a spring, a weight, or the like. By maintaining the speed of shaft 46ᵇ uniform the registering means will then indicate the density of the gas being tested, and the scale is calibrated in terms of weight per unit volume.

By comparing the torque produce on shaft 50ª with the torque produced in a second system similar to the one shown in Fig. 3, in which, however, a standard gas is circulated under identical pressure and temperature conditions, a register of the specific gravity is obtained.

Instead of drawing the gas through the measuring chamber 45ª the chamber 45 may be so arranged that the fan 46 presses the gas through chamber 45ª. Furthermore, the fan 46 may be replaced by any other means suitable for the transportation of gas, such as a pump or an aspirator. It is not necessary to locate the measuring chamber and the transport chamber in the same casing in which event the orifice 48 is replaced by a conduit.

Figures 4 and 5 illustrate an especially simple structure for carrying out my method. Of the two measuring chambers 51 and 52, the one contains the gas to be measured and the other the standard gas. The driving wheels 53 and 54 of the two chambers are arranged on a common hollow shaft 55, upon which is also mounted the driving pulley 56. The indicating wheels 57 and 58, one in each chamber, are mounted on a common shaft 59, to which is secured the indicator needle 60. This shaft is within hollow shaft 55 and is advantageously journaled in agate bearings 61. 62 is a glass face plate. In one of the casings, for example, casing 51, a segmental septum 63 (see Figure 5) partially divides the space occupied by one wheel 57 from that occupied by the other wheel 53, and one of the wheels, as for example, the wheel 57, has its vanes or paddles made with a constantly increasing length, as, for example, in the form of a volute, as shown in Figure 5. It must now be understood that the inclination of the vanes of all the wheels are such that with gases of equal density in both casings, the effort on the part of wheel 54 to drive wheel 58 in the direction of the arrow, will be exactly balanced by the effort of wheel 53 to drive wheel 57. This is brought about, for example, by proper inclination of the blades. With gas of the same density in the two chambers, the indicator needle 60 will, therefore, not be moved. Should, however, the density of the gas in chamber 51, be different than that in chamber 52, as lighter for instance, then the secondary system consisting of wheels 57 and 58, with their shaft 59 and needle 60, will move in the direction of the arrow; until such time as the increased area of the exposed vanes on wheel 57 compensates for the diminution in the density of the gas when the system will again reach a state of balance and the indicating needle 60 will show on a properly calibrated dial the relation between the density of the two gases, the standard gas and the one to be measured.

It will be seen that I have shown several ways in which the density of a gas may be measured by imparting kinetic energy to the gas and then measuring the amount of energy so imparted by causing the moving gas to exert its force against a body that will oppose a yielding resistance to the force of the gas, which body, having an indicator gives on a properly calibrated scale, a visual indication of the density of the gas being measured as compared with that of the air or of a standard gas.

I have also shown a method of bringing the standard gas and the gas to be measured to an equal degree of humidity which involves also a method of measuring the humidity of a gas to be measured by comparing its density with a standard gas having a known degree of humidity and that I have also shown a method whereby the density of a gas may be measured more accurately by filtering therefrom previous to measuring its density any solid suspended particles therein.

I claim:—

1. Measuring the density of a gas my imparting kinetic energy to the gas, and then measuring the amount of energy so imparted by causing the moving gas to exert its force against a movable body the motion of which is opposed by a cumulative resistance.

2. Method of measuring the density of a gas comprising, first, imparting kinetic energy to the gas to be measured, second, imparting kinetic energy to a standard gas, third, opposing the force produced by the energy imparted to the gas to be measured to the force produced by the energy imparted to the standard gas, and, fourth, measuring the combined effect of the two opposing forces.

3. Method of measuring the density of a gas comprising, imparting energy to the gas to be measured, causing the gas so energized to exert force against a yielding resistance, imparting energy to a standard gas, causing the energy so imparted to exert force upon the yielding resistance in a direction opposed to that of the gas to be measured, and registering the result of their combined action upon the yielding resistance.

4. Method of measuring the density of a gas by comparison with a standard gas comprising first causing the standard gas and the gas to be tested to assume the same degree of humidity, second imparting motion to the gas to be measured, third imparting motion to a standard gas, fourth opposing the energy of motion of the one gas against the energy of motion of the other and fifth measuring the differential effect produced.

5. Measuring the density of a gas by passing the gas through a filter to free it of suspended particles, imparting kinetic energy to the gas, and then measuring the amount of energy so imparted by causing the moving gas to exert torque on a movable body actuating a measuring device.

6. Method of measuring the density of a gas comprising, passing the gas through a filter to free it of suspended matter, imparting movement to the gas to be measured, causing the moving gas to act against a yielding resistance, imparting movement to a standard gas, causing the moving standard gas to act upon the yielding resistance in a direction opposed to that of the action of the gas to be measured, and registering the result of their combined action upon the yielding resistance.

7. The method of determining the density of gas which comprises imparting movement to a body of gas to be examined, similarly imparting movement to a body of gas of standard density, using the movement of each body to impart torque to a shaft and compounding the two torques to produce indications on a scale.

GEORG KÖNIG.